(12) United States Patent
Knoff et al.

(10) Patent No.: US 7,143,862 B2
(45) Date of Patent: Dec. 5, 2006

(54) POWER STEERING DEVICE FOR A VEHICLE

(75) Inventors: Bernd Knoff, Esslingen (DE); Dieter Neugebauer, Horb (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/067,465

(22) Filed: Feb. 25, 2005

(65) Prior Publication Data
US 2005/0167180 A1    Aug. 4, 2005

Related U.S. Application Data

(63) Continuation-in-part of application No. PCT/EP03/08870, filed on Sep. 8, 2003.

(30) Foreign Application Priority Data
Aug. 27, 2002 (DE) ................ 102 39 143

(51) Int. Cl.
 *B62D 5/06* (2006.01)
(52) U.S. Cl. .................... 180/406; 180/421
(58) Field of Classification Search .............. 180/405, 180/406, 417, 421
See application file for complete search history.

(56) References Cited

U.S. PATENT DOCUMENTS

| 4,828,065 | A |   | 5/1989  | Ishihara et al. |         |
|-----------|---|---|---------|-----------------|---------|
| 5,826,676 | A | * | 10/1998 | Ko              | 180/403 |
| 6,611,415 | B1| * | 8/2003  | Hagidaira et al.| 361/160 |
| 6,978,859 | B1| * | 12/2005 | Torizawa        | 180/405 |

FOREIGN PATENT DOCUMENTS

| EP | 1 108 638 | 6/2001 |
| EP | 0 026 586 | 8/2001 |

* cited by examiner

*Primary Examiner*—Kevin Hurley
(74) *Attorney, Agent, or Firm*—Klaus J. Bach

(57) ABSTRACT

In a power steering device comprising a power steering pump, and to a method for operating a power steering device for a vehicle comprising a hydraulic circuit provided with a rotary slide valve, a steering cylinder and a control valve for adjusting the volume flow of a hydraulic medium as required for steering assistance, the control valve is arranged on the pressure side of the pump in such a way that it divides the volume flow (Q) from the power steering pump into at least a first base partial flow (A) and a second controlled partial flow (B), the base partial flow (A) being independent from the operating state of the control valve and always available for steering assistance, whereas the partial flow (B) is dependent on the operating state of the control valve.

11 Claims, 1 Drawing Sheet

POWER STEERING DEVICE FOR A VEHICLE

This is a Continuation-in-Part Application of International Application PCT/EP03/08870 filed Sep. 8, 2003 and claiming the priority of German Application 102 39 143.2 filed Aug. 27, 2002.

BACKGROUND OF THE INVENTION

The invention relates to a power steering device for a motor vehicle.

Power steering systems are generally known and are commonly used in motor vehicles. In these systems a power steering pump circulates hydraulic fluid which is used for assistance in the execution of steering movements. Power steering pumps driven by an internal combustion engine circulate a specific quantity of oil constantly, however, even when this is not required. This consumes energy and generates heat and pollutants which have to be disposed of.

EP A1-1109638 discloses a power steering system with a regulated power steering pump in which the oil quantity is regulated as a function of the steering assistance requirement. The oil quantity is set by means of the opening ratio of the regulating valve in proportion to the electrical control current. However, in the event of a system failure, power assistance is no longer available.

U.S. Pat. No. 4,828,065 discloses a bypass valve which is arranged in a parallel branch to a power steering device and through which hydraulic fluid can bypass a steering valve.

It is the object of the present invention to provide a power steering device which still provides power assistance even in the event of a failure of the regulating valve.

SUMMARY OF THE INVENTION

In a power steering device comprising a power steering pump, and to a method for operating a power steering device for a vehicle comprising a hydraulic circuit provided with a rotary slide valve, a steering cylinder and a control valve for adjusting volume flow of a hydraulic fluid as required, the control valve is arranged on the pressure side of the pump in such a way that it divides the volume flow (Q) from the power steering pump into at least a first base partial flow (A) and a second controlled partial flow (B), the base partial flow (A) being independent of the operating state of the control valve, whereas the partial flow (B) is dependent on the operating state of the control valve.

With this arrangement, power assistance is available with any type of failure of the regulating valve, and at the same time, the power steering pump is controlled so as to provide an on-demand volume flow of the hydraulic fluid. This, on one hand, increases the operating reliability of the system, and, on the other hand, makes comfortable and on-demand steering assistance securely available.

In the event of a failure of the system, because of the division into a basic quantity and a regulating quantity, at least the basic quantity is always still available for power assistance, even if the regulating valve jams, so that the driver is in a position to execute normal steering movements with the usual comfort. This provides for an important safety margin as compared with the prior art along with a markedly improved energy saving and reduction in the operating temperature of the power steering pump.

The invention will become more readily apparent from the following description of a preferred embodiment thereof described below on the basis of the accompanying drawings.

DESCRIPTION OF A PREFERRED EMBODIMENT

Figure 1:
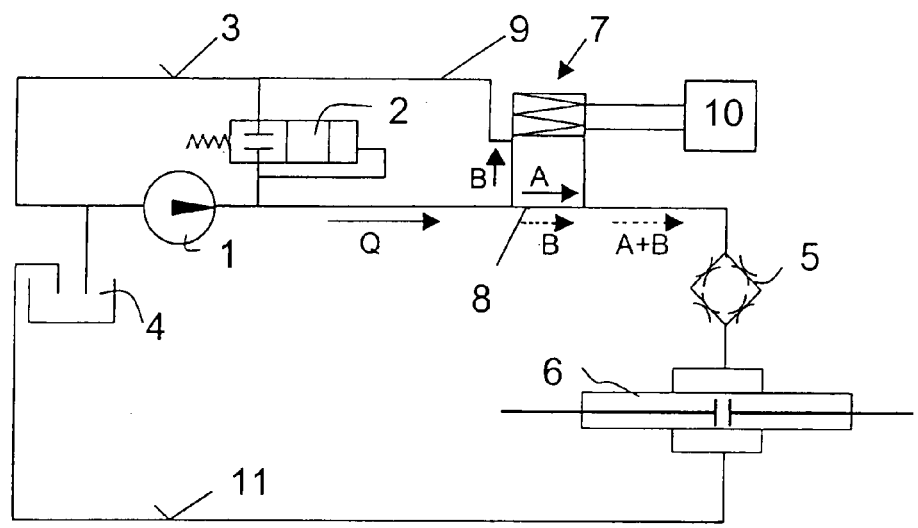
FIG. 1 shows a diagrammatic illustration of a hydraulic circuit with a controllable hydraulic fluid flow for a power steering device.

FIG. 1 illustrates diagrammatically a preferred hydraulic circuit with the power steering device according to the invention for a motor vehicle. It includes a power steering pump 1, which is expediently driven by an internal combustion engine by means of a belt drive, not illustrated. The power steering pump 1 constantly circulates hydraulic fluid, preferably oil, in a hydraulic circuit, designated as a whole by the numeral 11, through a rotary control valve 5 and a power steering cylinder 6 for steering vehicle wheels. A pressureless accumulator 4 for the hydraulic fluid, preferably oil, is arranged on the suction side of the power steering pump 1. The power steering pump 1 extracts oil from the accumulator 4 and returns it again to this accumulator 4. Furthermore, downstream of the power steering pump 1, that is on the delivery side of the latter, a conventional pressure limiting valve 2 is arranged, with an overpressure return line 3, in which oil can be returned in the customary way back to the inlet side of the power steering pump 1 and/or to the accumulator 4.

The circulating oil quantity is divided into a basic part stream A and a regulating part stream B, preferably on the delivery side of the power steering pump 1, by means of a regulating valve 7 for the demand dependent setting of a volume flow of a hydraulic fluid, the regulating valve preferably being a parameter-controlled electrically operated flow control valve. The regulating valve 7 is controlled by means of a control unit 10 which may be a separate unit or may be integrated into an already existing control apparatus of the vehicle. The regulating valve 7 is expediently integrated structurally into the power steering pump 1, but may also be a separate component.

In the control unit 10, the driving speed, the steering angle speed, the engine rotational speed, the transverse acceleration and further variables are processed in order to control the fluid flow to the power steering cylinder 6. The oil quantity supplied to the power steering cylinder 6 is increased or reduced as a function of the driving and steering situation.

The regulating valve 7 is arranged on the delivery side of the power steering pump 1 in such a way that the volume flow Q of hydraulic fluid supplied by the power steering pump 1 is divided at least into the first basic part stream A, which is independent of the operating state of the regulating valve 7, and a second regulated part stream B which is dependent on the operating sate of the regulating valve 7. Downstream of the regulating valve 7, the volume flow Q that is the two part streams A, B are supplied to the rotary slide valve 5 and used for steering assistance, if the full volume flow is needed. The individual volume flows Q, A B, A+B are identified in the drawing by arrows. The volume flow of the power steering pump 1 is divided in such a way that the basic part stream A is circulated independently of a driving and/or regulating situation and the regulating part stream B is regulated as a function of the demand and is either returned to pump inlet or directed with the flow A to the slide valve 5.

Figure 2:
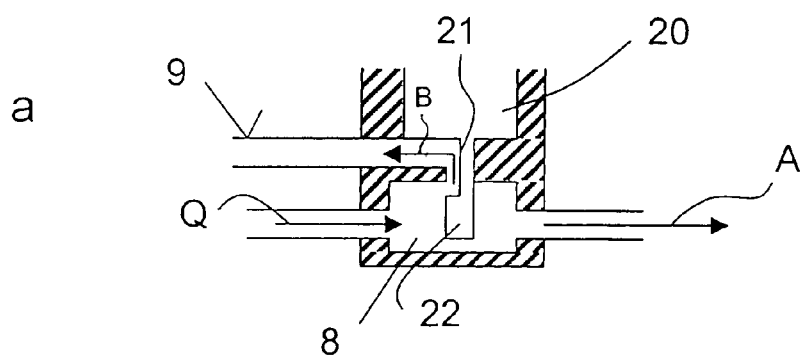
FIGS. 2a and 2b show, in detail, a parameter valve in the operating state (a) and in an inoperative state (b).
Figure 2:
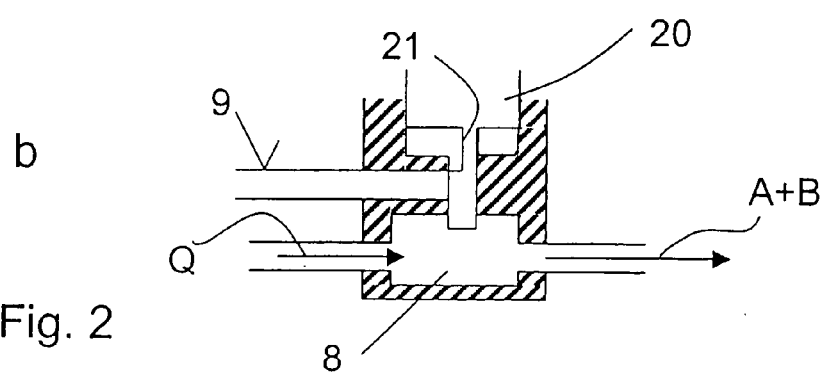

FIGS. 2a and 2b illustrate, in the form of a detail representation, a preferred regulating valve 7 in the maximum opening state (FIG. 2a) and in the closed position (FIG. 2b).

The oil flow quantity Q is conducted into the regulating valve 7. In the normal state, the regulating valve 7 is "closed" so that the passage 8 is partially closed by the valve needle 20, that is to such an extent that only the basic part stream A can pass through the regulating valve 7 and arrive at the rotary slide valve 5 while the part B is returned through a return line 9 to the pump inlet side. The valve needle 20 is thick at the lower end 22 and has a narrow area 21 along its longitudinal extent. The length of the narrow area 21 along the longitudinal extent is dimensioned such that, in the closed position, a passage between the passage 8 and the return line 9 is provided via this narrow area 21. The excess quantity B of the inflowing oil quantity Q leaves the regulating valve 7 via this connection and is discharged from the regulating valve 7 by way of the discharge line 9. This oil may either be supplied to the internal pump circuit on the suction side or else be conducted into the accumulator 4. In the "closed" state the regulating valve 7 provides a fluid flow of the size of the basic part stream A.

The regulating valve 7 is open in the inoperative that is the normal state. This can be seen in FIG. 2b. The valve needle 3 in this case completely opens the flow passage 8, At the same time, the thick end 22 of the valve needle 20 is shutting off the discharge line 9. Details of any sealing means are not shown. In the completely open state, the regulating valve 7 provides for a flow through the passage 8 in the size of the sum of the basic part stream A and the maximum regulating part stream B so that the entire volume flow Q=A+B is available for steering assistance.

Instead of a valve which always transmits at least the basic part stream A, however, an additional bypass line may be provided, through which the basic part stream A permanently flows. Then, a normal flow control valve can be used for controlling the return flow B to the pump inlet or the accumulator 4.

Advantageously, the regulating valve 7 is completely open when disabled.

In the operational state of the regulating valve 7, the volume flow Q can be regulated down to the basic part stream A by activation of the regulating valve 7.

When a vehicle equipped with the device according to the invention is traveling straight ahead, the regulating valve 7 is operational so that only the basic part stream A is supplied to the power steering pump 1. As a function of the driving situation, in the event of a steering movement, the application of current to the regulating valve 7 is reduced that is the needle raised to reduce the part stream B through the passage 21 for directing an increasing part thereof through the passage 8 together with the part stream A as the regulating valve 7 is being opened.

Even in the event of a jamming of the regulating valve in the closed position, a basic quantity is still always available for power assistance. Most driving maneuvers can consequently be carried out without difficulty. Only in the event of extreme steering movements or during parking may losses of comfort occur. In the event of a failure of the valve control unit 10 due to a control unit fault, a cable break or the like, the application of current to the regulating valve 7 is interrupted and consequently the full volume flow, regulating quantity A+B, is available for steering assistance. By the valve control unit 10 being integrated into an already existing control apparatus, preferably the engine control apparatus, a cost-effective solution can be achieved.

What is claimed is:

1. A power steering device for a vehicle with a hydraulic circuit (11) including a power steering pump (1), a rotary slide valve (5), a steering cylinder (6) and an electromagnetic regulating valve (7), arranged on the delivery side of the power steering pump (1) for the demand-dependent control of a volume flow (Q) of a hydraulic medium, by dividing the volume flow (Q) flowing through the regulating valve (7) into a first basic part stream (A) which can flow to the rotary slide valve (5) independently of the operating state of the regulating valve (7), and a second regulated part stream (B), which is directed controllably back to the power steering pump (1) through a return line 9 or to the rotary slide valve (5) as a function of the operating state of the regulating valve (7).

2. A power steering device as claimed in claim 1, wherein, in the closed state, the regulating valve (7) has a through-flow passage (8) providing for a basic part stream (A) and the maximum regulated part stream (B) retuning through the return line 9.

3. A power steering device as claimed in claim 1, wherein, in the completely open state, the regulating valve (7) provides a throughflow through the passage 8 of the size of the sum of the basic part stream (A) and the maximum regulated part stream (B).

4. The power steering device as claimed in claim 1, wherein in the regulating valve (7) excess hydraulic medium is supplied to a return line (9).

5. The power steering device as claimed in claim 1, wherein the regulating valve (7) is open in an inoperative state.

6. The power steering device as claimed in claim 1, wherein the regulating valve (7) is integrated structurally into the power steering pump (1).

7. A method for operating a power steering with a hydraulic circuit (11) including a power steering pump (1), a rotary slide valve (5), a power steering cylinder (6) and an electromagnetic regulating valve (7), arranged on the delivery side of the power steering pump (1) for the demand-dependent control of a volume flow (Q) of a hydraulic medium, wherein the volume flow Q of the power steering pump (1) is supplied to the magnetic regulating valve (7) and is divided thereby into a first basic part stream (A), which is independently circulated to the power steering cylinder (6) and a second regulated part stream (B), which is controlled by the regulating valve (7) as a function of demand and selectively supplied to the power steering cylinder (6) for steering assistance or returned to the power steering pump (1).

8. The method as claimed in claim 7, wherein, in an inoperative state of the regulating valve (7), the volume flow through the regulating valve (7) or parallel to the regulating valve (7) comprises at least the basic part stream (A).

9. The method as claimed in claim 7, wherein in the operative state of the regulating valve (7), the volume flow can be controlled down to the basic part stream (A) by activation of the regulating valve (7).

10. The method as claimed in claim 7, wherein, in straight ahead travel of the vehicle, the regulating valve (7) is energized whereby only the basic part stream (A) is supplied to the steering cylinder (6).

11. The method as claimed in claim 10, wherein, in the event of a steering action by a driver, the application off current to the regulating valve (7) is reduced, and the regulated part stream (B) is controlled by opening of the regulating valve (7) so that a controlled part thereof is added to the basic part stream (A).

* * * * *